Figure 1:
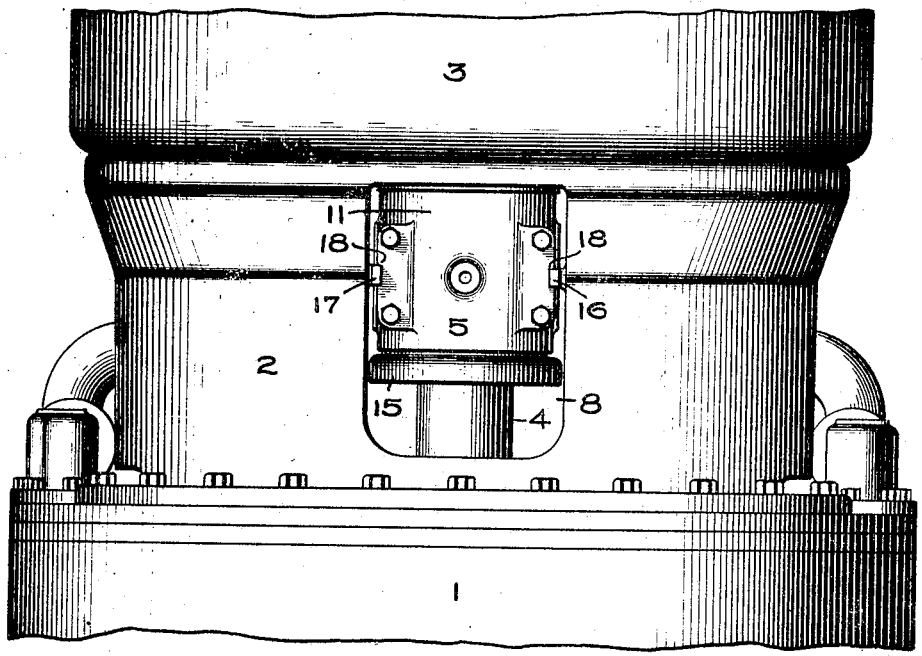

O. JUNGGREN.
MIDDLE BEARING FOR VERTICAL SHAFT TURBO-GENERATORS.
APPLICATION FILED FEB. 26, 1909.

922,593.

Patented May 25, 1909.
2 SHEETS—SHEET 1.

Witnesses:
Marcus L. Byng.
J. Ellis Glen

Inventor:
Oscar Junggren,
by
Att'y.

O. JUNGGREN.
MIDDLE BEARING FOR VERTICAL SHAFT TURBO-GENERATORS.
APPLICATION FILED FEB. 26, 1909.

922,593.

Patented May 25, 1909.

2 SHEETS—SHEET 2.

Witnesses:
Marcus L. Byng.
J. Ellis Glen.

Inventor:
Oscar Junggren,
by Albert G. Davis
Atty.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

MIDDLE BEARING FOR VERTICAL-SHAFT TURBO-GENERATORS.

No. 922,593.     Specification of Letters Patent.     Patented May 25, 1909.

Application filed February 26, 1909. Serial No. 480,113

*To all whom it may concern:*

Be it known that I, OSCAR JUNGGREN, a citizen of the United States, residing at Schenectady, county of Schenectady, State of New York, have invented certain new and useful Improvements in Middle Bearings for Vertical-Shaft Turbo-Generators, of which the following is a specification.

Elastic fluid turbines of the vertical shaft type are largely used to drive electric generators both of the alternating and direct current types. Mounted on top of the turbine casing is a stool or support upon which the generator rests. A single piece shaft is commonly used for both turbine and generator although a two-piece shaft may be employed with a suitable coupling between. The shaft, however it be made, is usually provided with three guide bearings, one at the bottom, one between the turbine and generator, detachably supported by the stool or support, and the third at the top of the generator. The weight of the shaft and that of the revolving members of the turbine and generator carried thereby is supported by a step bearing.

Trouble has been experienced with the supporting means for the middle bearing because the parts thereof and the stool or support do not expand and contract equally in the same unit of time and as a result the supporting means are sometimes broken resulting in shut downs and sometimes causing material damage. Further since the bearing parts are separable or detachable from the support is is a more or less difficult matter to aline the bearing originally, and also to realine it when for any reason the machine is reassembled after being taken down. It is also a difficult task to remove the cap of the middle bearing owing to its great weight and to the fact that it is located in a relatively restricted space between two parts of much larger diameter and where it is impossible to use a crane or other power means until the cap has been moved manually to one side of the machine and out of line with the generator.

The present invention has for its object to provide a middle bearing for a vertical shaft turbine and its driven apparatus, and a support for it and said apparatus which is free from the objections above noted.

For a consideration of what I believe to be novel and my invention, attention is directed to the accompanying description and the claims appended thereto.

Figure 2:
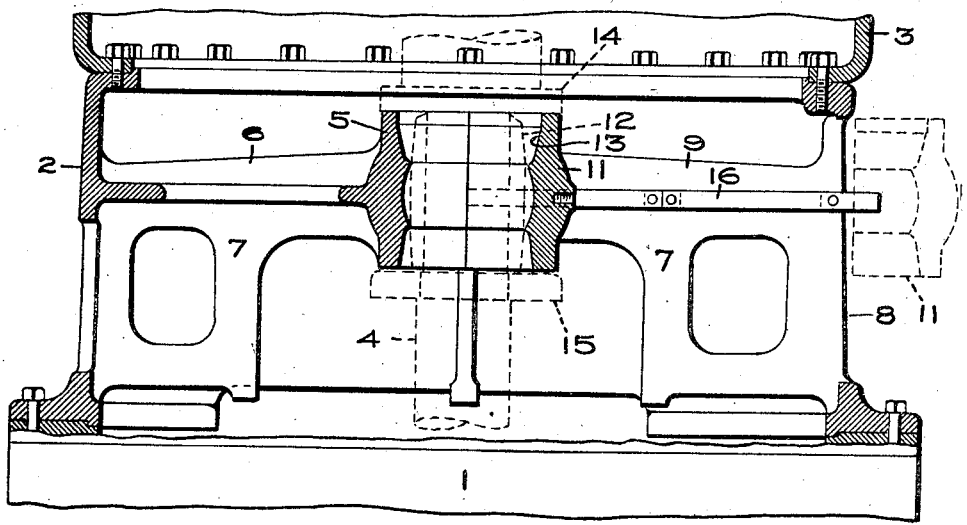
Figure 3:
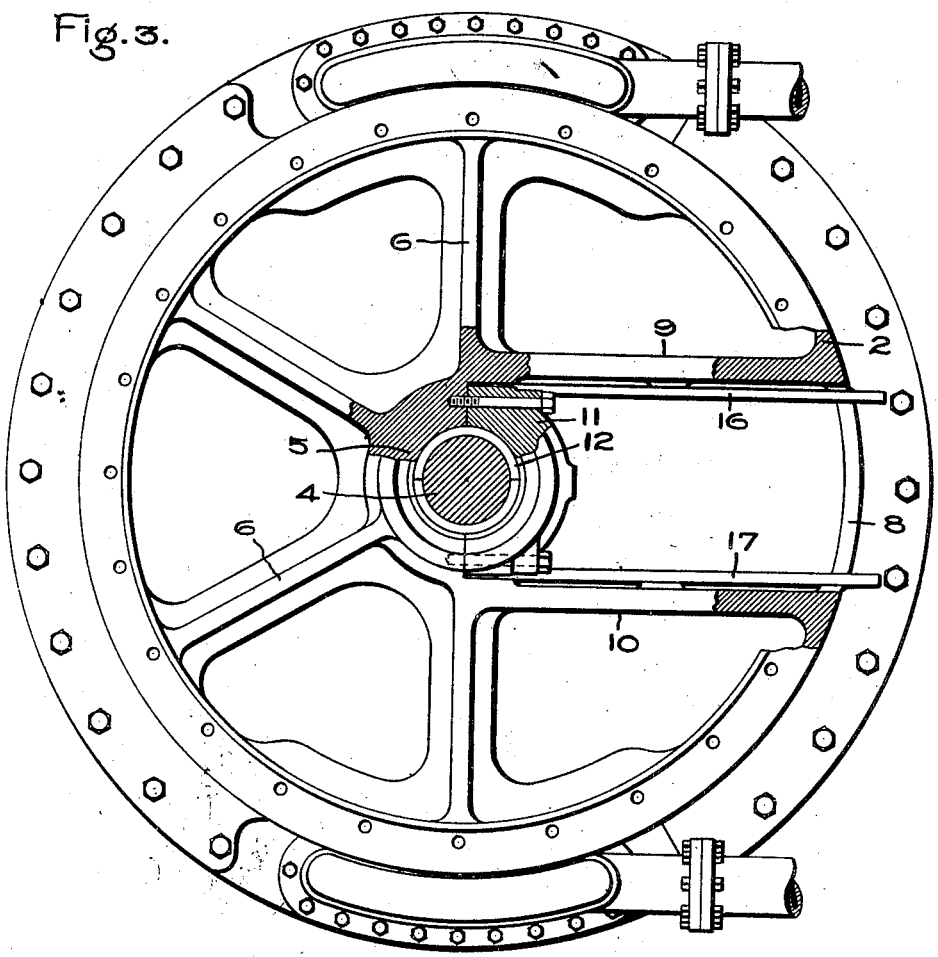

In the accompanying drawings which illustrate one of the embodiments of my invention, Figure 1 is a partial view in side elevation of the turbine and generator with the intervening support; Fig. 2 is an axial section of the same showing the relation of the bearing to the other parts; and Fig. 3 is a plan view of the turbine and stool or support with certain of the parts in section.

1 indicates the turbine which may be of the Curtis or other type. As shown, steam is admitted to the wheel from opposite sides to assist in reducing strains due to distortion. Mounted on the upper head is an annular stool or support 2 that supports the generator 3 and maintains the parts in proper alinement. The lower end of the annular support is provided with an outwardly extending flange that is bolted to the top of the turbine casing, and the upper end with an inwardly extending flange that is bolted to the casing of the generator. These flanges coöperate with the annular wall of the support to make it exceedingly rigid. The revolving members are carried by the vertical shaft 4 that is supported against lateral thrust in the middle bearing 5.

The bearing is supported by a number of radial arms 6 that are cast integral with it and with the main body of the support 2. These arms are braced above and below by thick ribs 7 so as to withstand strains of all kinds to which they may be subjected. The annular support or stool is cut away on one side to provide an opening 8 through which the bearing cap can be removed, and through which a man can enter to get at the bearing. One or more additional openings may be made to reduce the weight of the support or for other reasons. On one side of the shaft the arms 9 and 10 instead of extending radially from the shaft extend parallel to each other to provide a means whereby the bearing cap can be readily removed as will appear later. These arms are also braced by ribs 7.

The cap 11 of the bearing is made detachable and is secured in place by bolts arranged on opposite sides thereof. The particular machine to which my invention is applied has an output of 14,000 kilowatts, and the bearing cap alone weighs three thousand pounds. The distance from the top of the turbine to the bottom of the generator is between 5 and 6 feet, and the diameter of said support midway of its ends is between 12 and 13 feet. The weight of the support and the fixed part of the bearing is approximately 41,000 pounds. This will give some idea both as to the size of the machine and the difficulties attending the mounting and removal of the bearing cap. These figures are given as an illustration and not as a limitation of my invention because obviously the same arrangement can be utilized with heavier as well as with lighter parts, although the invention is not especially intended for use in relatively small machines where the parts can readily be handled The bearing is bored out to form a spherical seat for the sleeve 12. The sleeve may be made in two parts and is provided with a spherical enlargement that makes a good fit in the seat. The bearing is extended at 13 both above and below the seat in order to provide sufficient metal to make a rugged structure. The upper end also acts as a support for the shaft when the step bearing is removed and the collar 14 rests thereon. The sleeve 12 is held between collars 14 and 15. By making the sleeve 12 in two parts it can be removed when the cap is taken off without disturbing the other parts of the bearing or its support.

To facilitate the removal of the cap the opposed faces of the parallel arms 9 and 10 are provided with fixed tracks or guides 16 and 17 that extend perpendicularly to a plane passing through the shaft and from the meeting faces of the bearing to a point some distance beyond the stool or support, as shown in Fig. 2. These tracks or guides can be formed integral with the arms but it is preferable, owing to the reduced cost of manufacture, to spot face the arms and bolt the tracks to the finished spots or faces. On the sides of the cap are shoulders 18 that rest on the tracks. The shoulders are formed by cutting slots or grooves in the sides of the cap and are of such a size that they make an easy fit with the tracks. Owing to the fact that the cap has considerable stock at these points a long bearing surface is provided which holds the cap in an upright position while being moved toward and away from the shaft and which also prevents the same from being cramped in place during such operation. The tracks and slots should be so arranged that when the cap bolts are removed the cap will be supported in position, and so that when the cap is slid into place by moving it along the tracks that the bolt holes in the cap and in the bearing proper will register. In this way raising, lowering or side-wise movements of the cap will be avoided, and the labor incident thereto reduced to a minimum.

Assuming that it is desired to mount the cap in place it is brought by a crane or other means to substantially the dotted line position shown on the right of Fig. 2, and is then pushed into place along the guides, the crane assisting until the cap is fully supported by the tracks. In this way all manual lifting of the parts is avoided, and the labor of mounting is limited to sliding the cap along the tracks which is a very great advantage as will be evident to those skilled in the art.

In my improved construction since the arms that support the bearing are formed integral with one portion of it and with the annular support for the generator, it is evident that expansion and contraction will affect all parts equally and hence the danger of the parts getting out of line or breaking is reduced to a minimum. By making the fixed part of the bearing integral with the arms and annular support it is easier to aline the parts of the machine than where both parts of the bearing are separable from said support, and once the alinement is obtained it is a relatively easy matter to assemble the machine in the station of the operating company. Since four of the arms supporting the bearing are exactly radial and the other two are not greatly removed from such relation the stresses in said arms will be practically uniform as will also the stresses on the annular support.

In accordance with the provisions of the patent statutes, I have described the principle of operation of my invention, together with the apparatus which I consider to represent the best embodiment thereof; but I desire to have it understood that the apparatus shown is only illustrative, and that the invention can be carried out by other means.

What I claim as new and desire to secure by Letters Patent of the United States, is:—

1. In combination, a vertical shaft motor, an apparatus driven thereby, an annular support which rests on the motor and supports said apparatus, a vertical bearing for the shaft having a detachable cap, arms formed integral with the support and the fixed part of the bearing, and means for sustaining the weight of the cap when it is moved to and from its normal position.

2. In combination, a vertical shaft motor, an apparatus driven thereby, an annular support which rests on the motor and supports said apparatus, a vertical bearing for the shaft having a detachable cap, arms formed integral with the support and the fixed part of the bearing, tracks extending perpendicular to the shaft and in a position to support the cap at substantially its normal level, and means on the cap that coöperate with the tracks to permit of its being moved along the latter.

3. In combination, a vertical shaft motor, an apparatus driven thereby, an annular support which rests on the motor and supports said apparatus, a vertical bearing for the shaft having a detachable cap, with shoulders on its sides, arms formed integral with the support and the fixed part of the bearing, and horizontal tracks carried by two of the arms, the said shoulders on the bearing cap resting on the tracks and supporting it when the cap bolts are removed and also permitting the cap to be moved toward and away from the shaft and the fixed part of the bearing.

4. In combination, a vertical shaft motor, an apparatus driven thereby, an annular support which rests on the motor and supports said apparatus, a vertical bearing for the shaft having a detachable cap, radial and parallel arms formed integral with the fixed part of the bearing and the support, tracks carried by the parallel arms, grooves in the cap into which the tracks extend for supporting and guiding the cap as it is moved toward and away from the shaft.

5. In combination, a vertically disposed annular support, a vertically disposed fixed bearing member, a support for said member formed integral with it and the support, a detachable cap for the bearing, and means for guiding the cap as it is moved toward and away from the shaft and its normal position.

6. In combination, a vertically disposed annular support of relatively large diameter, a vertically disposed bearing member of relatively small diameter carried by the support at a point between its ends, a removable cap for the bearing, and tracks carried by the support on which the cap rests for moving it toward and away from the shaft and said bearing member.

In witness whereof, I have hereunto set my hand this 23rd day of February, 1909.

OSCAR JUNGGREN.

Witnesses:
BENJAMIN B. HULL,
HELEN ORFORD.